United States Patent [19]

Tripodi

[11] Patent Number: 5,115,371
[45] Date of Patent: May 19, 1992

[54] CIRCUIT BREAKER COMPRISING AN ELECTRONIC TRIP DEVICE

[75] Inventor: Paul Tripodi, Eybens, France
[73] Assignee: Merlin Gerin, France
[21] Appl. No.: 577,605
[22] Filed: Sep. 5, 1990

[30] Foreign Application Priority Data

Sep. 13, 1989 [FR] France ............................ 89 12083

[51] Int. Cl.⁵ .............................................. H02H 5/04
[52] U.S. Cl. ........................................ 361/106; 361/97;
361/115; 361/78; 335/44
[58] Field of Search .................... 361/103, 106, 78, 75,
361/97, 115, 25, 27, 83, 94, 37; 374/152, 10;
337/99; 335/43, 44, 45

[56] References Cited

U.S. PATENT DOCUMENTS

| | | | |
|---|---|---|---|
| 3,863,186 | 1/1975 | Mallonen | 337/99 |
| 3,927,570 | 12/1975 | Hedvall et al. | 374/152 |
| 4,001,649 | 1/1977 | Young | 361/106 |
| 4,232,551 | 12/1980 | Pierce | 374/152 |
| 4,571,659 | 2/1986 | Demeyer et al. | 361/97 |

FOREIGN PATENT DOCUMENTS

| | | |
|---|---|---|
| 0005324 | 11/1979 | European Pat. Off. . |
| 0115733 | 8/1984 | European Pat. Off. . |
| 0133969 | 3/1985 | European Pat. Off. . |
| 3320391 | 12/1983 | Fed. Rep. of Germany . |
| 1056308 | 1/1967 | United Kingdom . |

Primary Examiner—A. D. Pellinen
Assistant Examiner—Christopher Schultz
Attorney, Agent, or Firm—Parkhurst, Wendel & Rossi

[57] ABSTRACT

The circuit breaker comprises a thermistor located in a cold zone, near the front face of the trip device and at least one thermistor located in a hot zone, at the bottom of the circuit breaker case, in proximity to the circuit breaker connection terminals. The temperature difference measured between the hot and cold zones is representative of the temperature rise of the system protected by the circuit breaker and is used to modify the time delay of a delayed tripping function when the circuit breaker closes. The trip device can also take into account the temperature difference existing at the time of the previous trip.

15 Claims, 6 Drawing Sheets

CIRCUIT BREAKER COMPRISING AN ELECTRONIC TRIP DEVICE

BACKGROUND OF THE INVENTION

The invention relates to a molded case electrical circuit breaker, comprising at least one connection terminal to a conductor designed to be protected by the circuit breaker, detection means of the current flowing in the conductor, measurement means of the temperature in a predetermined zone of the circuit breaker, an electronic trip device, to which the output signals from the current detection means and the temperature measurement means are applied, performing at least a delayed tripping function so as to generate a tripping order when the current exceeds preset thresholds, the trip device comprising means designed to modify the time delay in terms of the temperature measured when the circuit breaker closes, the circuit breaker comprising tripping means controlled by said tripping order.

Figure 1:
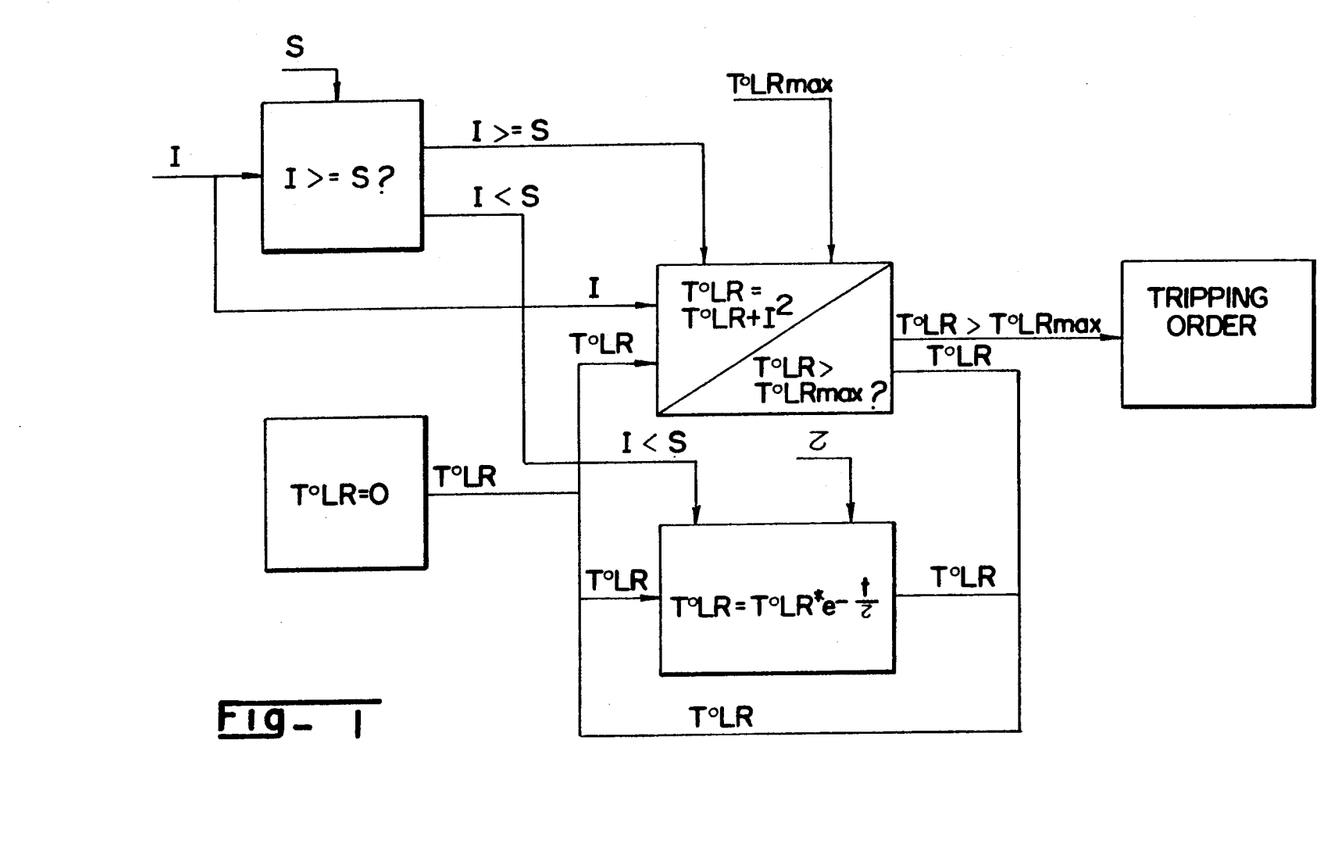
FIG. 1 schematizes the long delay function of a conventional electronic trip device.

Conventional electronic trip devices do not take account of the thermal history of the system which has been disconnected by the associated circuit breaker when the circuit breaker recloses. This may, in some cases, lead to a dangerous temperature rise of the system. In practice, conventional electronic trip devices simulate the thermal state of the system mathematically in the event of a short or long delay fault, the time delay then being inversely proportional to the square of the fault current. This partial simulation of the thermal state of the system only takes account of the temperature rise due to the fault current and of the cooling due to a possible decrease of the fault current during the time delay period. The flow chart in FIG. 1 schematizes the long delay function of a conventional microprocessor-based trip device. A quantity T°LR, which is the thermal image representative of the thermal state of the system protected by the circuit breaker, is initially set to a minimum value, 0 in the figure. The measured phase current I, in fact the highest current flowing in one of the phases of the system protected by the circuit breaker, is compared with an adjustable long delay threshold S. When this current is greater than or equal to the threshold S, the quantity T°LR is replaced by the sum T°LR+I², thus simulating the temperature rise of the system. The new value T°LR, thus computed, is compared with a new adjustable maximum value T°LRmax. So long as this maximum value is not reached the process continues, thus resulting in a time delay inversely proportional to the square of the fault current. When the maximum value is exceeded the trip device produces a tripping order of the associated circuit breaker. If the current is lower than the threshold S, the quantity T°LR is decremented, for example replaced by T°LR×e$^{-t/\tau}$, $\tau$ being a preset cooling time constant and t the time elapsed since the fault ceased, thus simulating the cooling of the system. When T°LR reaches the minimum value, 0 in the figure, the quantity T°LR remains unchanged so long as the current I remains below the threshold S. Thus, if the conditions required to bring about tripping disappear before tripping occurs, there is no tripping order and a return to normal takes place progressively so as to simulate a thermal memory of the system.

It is moreover advisable, when a circuit breaker recloses, to take account of the thermal state of the system which has been disconnected by the circuit breaker. This thermal state depends both on the thermal state existing just before the trip and on the time elapsed since the trip, during which time the system has cooled down.

It has been proposed (U.S. Pat. No. 4,616,324) to continue the simulation of cooling after a circuit breaker trip using an RC circuit charged at the time of tripping. Such an approach does not however take account of all the factors involved in the system temperature rise and in many cases the thermal image thus obtained is not representative of the actual state of the system.

It has moreover been proposed (U.S. Pat. No. 4,631,625) to initialize the tripping characteristics of an electronic trip device, when the circuit breaker closes, according to the value of thermistors located on the conductors protected by the circuit breaker. Locating thermistors on the conductors gives rise to problems, notably of fixing and insulation, and the temperature of the conductors is not in fact truly representative of the system temperature rise.

The object of the present invention is to achieve a circuit breaker with an electronic trip device enabling the thermal history of the system to be protected to be better taken into account.

SUMMARY OF THE INVENTION

According to the invention this object is achieved by the fact that the temperature measurement means comprise temperature measurement means in a cold zone of the case and temperature measurement means in a hot zone of the case, in proximity to the connection terminals, the trip device comprising computation means of the temperature difference between the hot and cold zones, and means designed to modify the tripping function time delay in a manner inversely proportional to the temperature difference measured when the circuit breaker closes.

According to a preferred embodiment of the invention, the trip device comprising, in order to perform the delayed tripping function, comparison means of a quantity representative of the thermal state of the circuit breaker with a preset maximum value, means of incrementing this quantity when the current I is greater than or equal to a preset tripping threshold and of decrementing it when the current is lower than said threshold, the means designed to modify the time delay comprise initialization means of said quantity when the circuit breaker closes, the initial quantity being proportional to the temperature difference measured when the circuit breaker closes.

The trip device can in addition comprise storing means of the hot and cold temperatures measured just before a tripping order is sent, reading means of the stored values when the circuit breaker subsequently closes and computation means of the temperature difference between the hot and cold temperatures on tripping, the initial quantity being such that the relationship between this initial quantity and the maximum value of the quantity representative of the thermal state of the circuit breaker is proportional to the relationship between the temperature difference when the circuit breaker closes and a maximum temperature difference, the latter being equal to the temperature difference measured at the time of the previous circuit breaker trip.

The temperature measurement is preferably achieved by means of thermistors located on the one hand in proximity to the front face of the trip device and on the other hand at the bottom of the circuit breaker case, in proximity to an insulating component, near the circuit breaker connection terminals. In this way the thermal capacity of the circuit breaker case is used to simulate the thermal state of the system protected by the circuit breaker. The hot zone thermistors can be fitted on insulating cables connected to the connection terminals.

BRIEF DESCRIPTION OF THE DRAWINGS

Other advantages and features will become more clearly apparent from the following description of illustrative embodiments of the invention, given as non-restrictive examples only and represented in the accompanying drawings, in which.

DESCRIPTION OF THE PREFERRED EMBODIMENT

Figure 2:
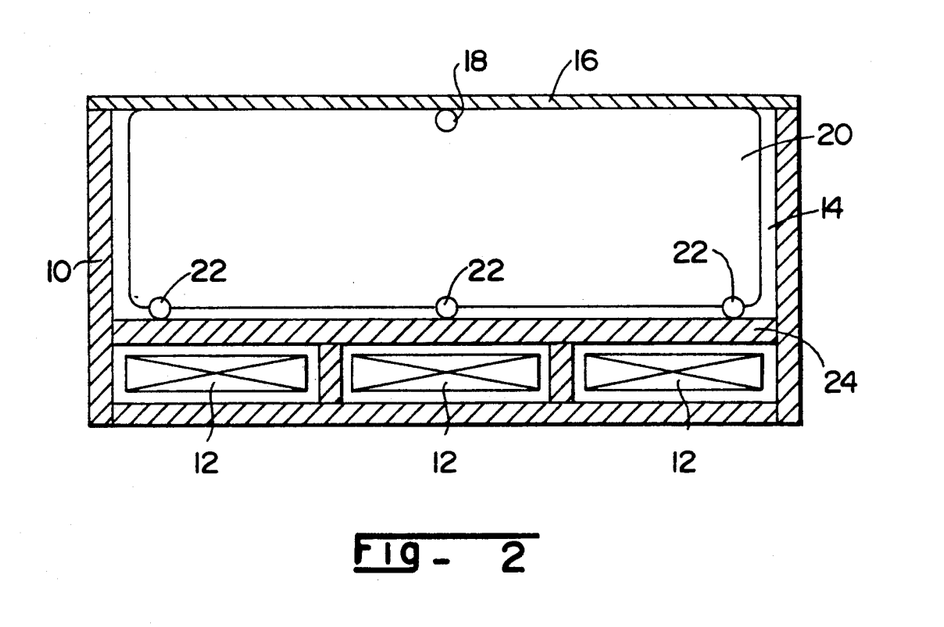
FIG. 2 schematically represents an alternative arrangement of thermistors inside the case of a circuit breaker according to the invention.

In FIG. 2, the case 10 of a three-pole circuit breaker is schematically represented in cross-section. The connection terminals 12 of the circuit breaker, which constitute the primary windings of the circuit breaker current transformers (not shown), are located in the bottom of the case, whereas the electronic trip device 14 is located in the front part of the case, closed by a cover 16 forming the front face of the trip device. A thermistor 18 is fitted in a cold zone of the case. In the embodiment represented in FIG. 2, the thermistor 18 is located on a printed circuit board 20 of the trip device, in such a way as to be situated in proximity to the front face 16 of the trip device, preferably in contact with this face. Thermistors 22 are fitted in a hot zone of the case, in proximity to the connection terminals. In the embodiment according to FIG. 2, the thermistors 22 are also located on the printed circuit board 20, in such a way as to be situated in proximity to a wall 24 of the case separating the connection terminals 12 from the trip device 14, preferably in contact with the wall 24.

The thermistors enable the temperatures T°fr of the cold zone and T°ch of the hot zone respectively to be measured. A single thermistor 18 is sufficient to give the value of the temperature in the cold zone. However, to compensate for the low thermal conductivity of the material (plastic) forming the case, it is preferable to use a thermistor 22 in proximity to each heat source in the hot zone. In FIG. 2, a thermistor 22 is located opposite each of the connection terminals 12 of the circuit breaker. The temperature of the hot zone is then provided by the highest temperature measured by the thermistors 22.

Figure 3:
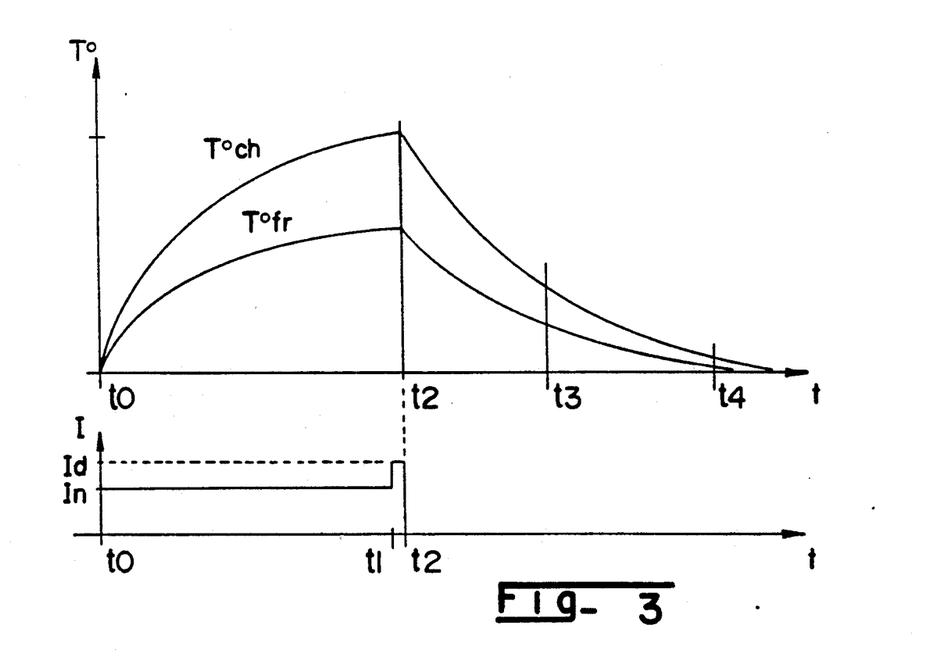
FIG. 3 represents the corresponding current and temperature variations in a circuit breaker according to FIG. 2.

FIG. 3 illustrates the temperature variations versus time when the current corresponding to the minimum current In between times t0 and t1 takes a fault value Id at the time t1 leading to tripping of the circuit breaker at the time t2 after a certain time delay. When the circuit breaker is cold, having been out of operation for a sufficiently long time, the two zones are at the same temperature, corresponding to the ambient temperature. At the time t0 the circuit breaker is closes and, until the time t1, has flowing through it a current, In in FIG. 3. The temperatures of the cold and hot zones increase, the temperature difference between the two zones, which increases, becoming stable after a certain time (for example 2 to 3 hours). After tripping of the circuit breaker, at the time t2, the temperatures decrease. The difference DT° = T°ch − T°fr between the temperatures of the hot and cold zones is a function of the time elapsed since tripping and this difference is used to modify, the tripping function time delay at the time the circuit breaker closes.

Figure 4:
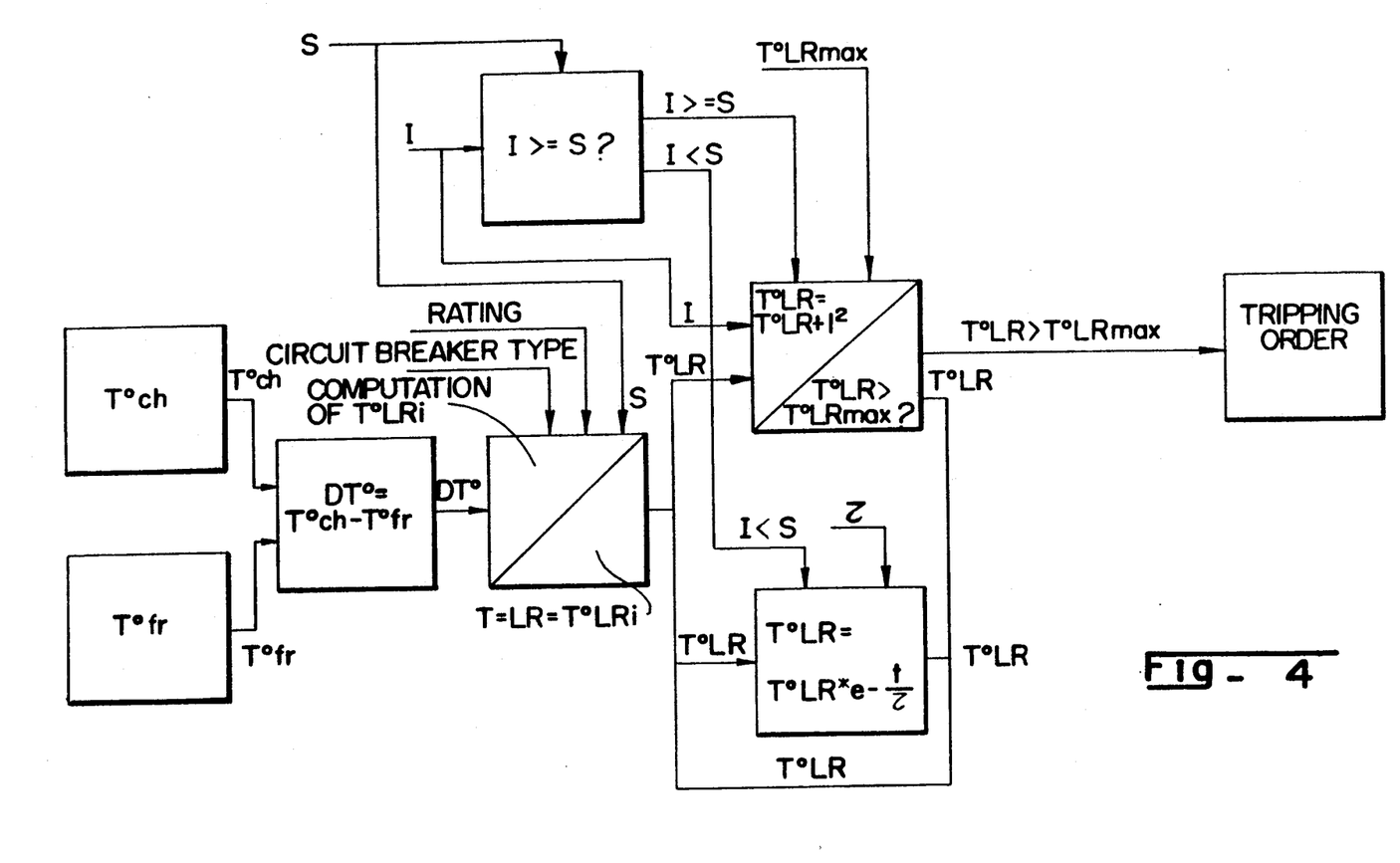
FIGS. 4 and 5 represent two alternative versions of the flow chart of the long delay function of the trip device of a circuit breaker according to the invention.

As shown in FIG. 4, the difference DT°, measured when the circuit breaker closes, is used to compute the initial value T°LRi of the quantity T°LR representative of the thermal state of the system.

Figure 6:
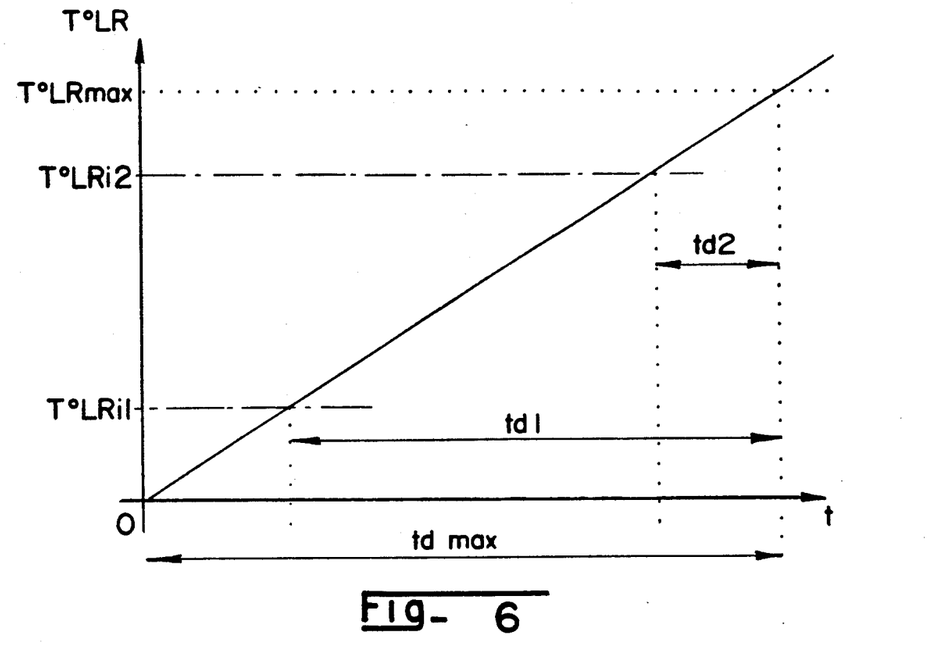
FIGS. 6 and 7 illustrate the influence of initialization of the quantity T°LR on the time delay.
Figure 7:
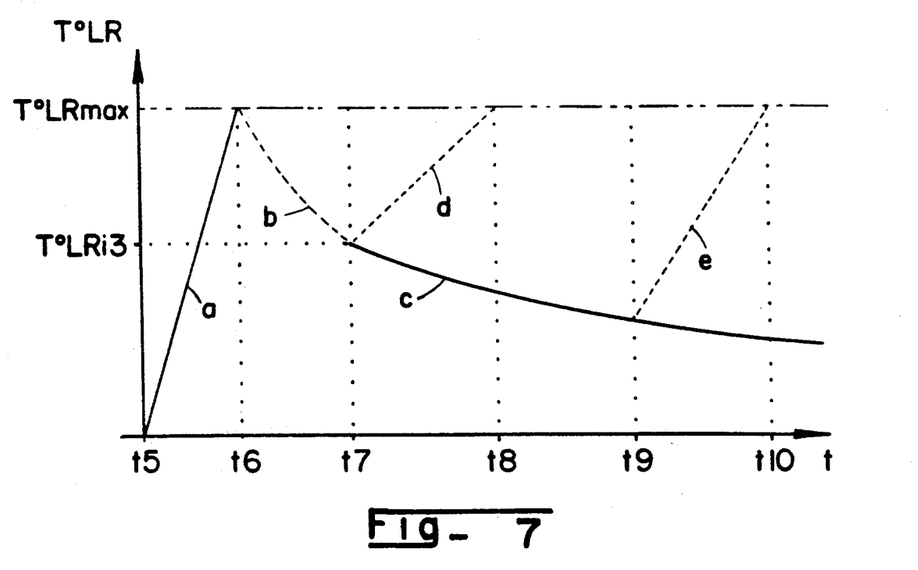

The influence of initialization of the quantity T°LR on the time delay is illustrated in FIGS. 6 and 7. In FIG. 6 the variation of T°LR, in terms of time, has been represented between the time the fault occurs and the time tripping occurs, assuming that the fault current Id is constant. The temperature rise of the system, proportional to the square of the fault current, then leads to a linear increase of T°LR from its initial value to the value T°LRmax leading to tripping. If the circuit breaker is cold when it closes, T°LR is initially zero and the time delay tdmax is a function of the square of the fault current. However, if after a trip (at time t2 in FIG. 3), the circuit breaker recloses before the temperature of the hot zone has decreased to the temperature of the cold zone, respectively at the times t3 or t4 in FIG. 3, T°LR is initially set to a value T°LRi2, respectively T°LRi1, which is higher the shorter the time separating tripping from reclosing, i.e. which is higher the greater the temperature difference DT°. The higher T°LRi is, the shorter the time delay: for a same fault current, and therefore for a same variation of T°LR in terms of time, the time delay td2 corresponding to a high initial value T°LRi2 is lower than the time delay td1 corresponding to a less high initial value T°LRi1 (FIG. 6). The time delay td is given by:

$$td/tdmax = (T°LRmax - T°LRi)/T°LRmax.$$

FIG. 7 represents an example of the variations of the quantity T°LR versus time. As the circuit breaker was closed when the temperature difference DT° was zero, the initial value of T°LR is zero reset. At the time t5, a fault current occurs and the value of T°LR increases linearly (curve a), proportionally to the square of the fault current until the time t6 when it reaches the value T°LRmax, causing the circuit breaker to trip. When the circuit breaker recloses at the time t7, T°LR is initialized to the value T°LRi3 which is a function of the temperature difference DT° measured at that time by the thermistors (FIG. 4). This decrease (curve b) of T°LRmax to T°LRi3 is an exponential decrease and takes place with a time constant representative of the cooling time constant of the case. If the current remains below the long time delay threshold (S, FIG. 4), the value of T°LR decreases exponentially with the fixed preset time constant τ (FIG. 4) in the electronic trip device until it reaches its minimum value, i.e. zero in FIG. 7 (curve c). The time constant τ is greater than the cooling time constant of the case for, with the circuit breaker closed, the system still has the rated current flowing through it thus limiting its cooling. If a fault current is present when reclosing takes place at the time t7, the value of T°LR increases from the initial value T°LRi3 up to the tripping value T°LRmax, causing a new trip at the time t8 (curve d). Curve e represents the occurrence of a fault current at the time t9 leading to tripping at the time t10. The gradients of the straight lines a, d and e schematize different fault currents.

Thus, when the circuit breaker is closed, the trip device computes the variation of the quantity T°LR in terms of the current and of the long delay threshold (S): curves a, d or e if the current is greater than the threshold S and curve c if the current is lower than the threshold S. The thermistors, for their part, serve the purpose of determining the initial value T°LRi at the time the circuit breaker recloses so as to take into account the cooling of the case after the circuit breaker has tripped (curve b).

The initial value T°LRi is proportional to the temperature difference DT° between the hot and cold zones of the circuit breaker measured at the time the circuit breaker closes (FIGS. 3 and 6). This initial value also depends on the circuit breaker type and rating and on the setting of the long delay threshold S (FIG. 4). To give an example, a circuit breaker operating at its operating limits will lead to a very high temperature difference DT° whereas for an overrated circuit breaker the heat rise will be lower and this difference will be slight. For a given circuit breaker the values of T°LRi with respect to DT° can be determined experimentally, and in the case of a microprocessorbased trip device a correspondence table is stored in a memory of the trip device. In this case, when the circuit breaker closes, the values T°ch and T°fr measured by the thermistors are read by the trip device, the difference DT° is computed and the corresponding value of T°LRi obtained from the table.

The initial value T°LRi can also be obtained by computation using the general formula:

$$T°LRi = T°LRimin + (T°LRimax - T°LRimin)(DT° - DT°min)/(DT°max - DT°min)$$

in which all the quantities T°LR are expressed as a percentage of T°LRmax and T°LRimin, in which T°LRimax, DT°max and DT°min are preset values depending notably on the circuit breaker type and rating and the long delay threshold S. In the simplest case DT°min=0, T°LRimin=0, and T°LRimax=T°LRmax, and consequently: T°LRi/T°LRmax=DT°/DT°max. T°LRi can then vary between 0 and T°LRmax, proportionally to DT° which varies between 0 and DT°max, DT°max being, for a given circuit breaker, the maximum temperature difference, defined experimentally, liable to be reached by this circuit breaker (FIG. 3).

According to a preferred embodiment the variation of T°LRi is limited to a range going from T°LRimin to T°LRimax. T°LRimax, corresponding for example to 80% T°LRmax, is designed to introduce a minimum time delay, set arbitrarily, in the event of closing on a fault. In practice the value T°LRimin will generally be chosen equal to 0, the choice of a different value amounting to systematically decreasing the time delay (tdmax, FIG. 6). The formula then becomes: T°LRi/T°LRimax=DT°/DT°max. T°LRi can then vary between 0 and T°LRimax, i.e. between 0 and 80% of T°LRmax, proportionally to DT°, which varies between 0 and DT°max.

The value DT°min can be chosen different from zero, for example DT°min=20% of DT°max. The initial value T°LRi is then equal to its minimum value, generally zero, as soon as the temperature difference between the hot and cold zones of the circuit breaker is lower than DT°min. In this case the circuit breaker is considered to be sufficiently cooled and the maximum temperature is maintained.

As an example, for a circuit breaker of 1000 Amps rating, whose long delay threshold S is set to 1000 Amps, experimental measurements having shown that the temperature difference at 1000 Amps stabilizes around 30° C., the value DT°max is set to 30° C.

For a circuit breaker of the same type, whose long delay threshold S is set to 400 Amps, the value DT°max will be reduced accordingly.

As an example, for a circuit breaker of 1000 Amps rating, for which the setting of the threshold S corresponds to a temperature difference DT°max of 30° C., T°LRimin being chosen equal to zero, T°LRimax to 80% of T°LRmax, and DT°min to 20% of DT°max, the temperatures being expressed as percentages of DT°max, the initial value T°LRi, expressed as a percentage of T°LRmax, is given by:

$$T°LRi = 0 + (80-0)(DT°\% - 20\%)/(100\% - 20\%)$$

$$T°LRi = (DT° - 20\%)$$

For DT°=20° C., i.e. 66% of DT°max we obtain:
T°LRi=46% of T°LRmax, whence td: 64% of tdmax.

The following table gives different values of T°LRi in terms of the corresponding values of DT° on closing, of the circuit breaker, in the above example:

| DT° (°C.) | 0 | 5 | 10 | 15 | 20 | 25 | 30 |
|---|---|---|---|---|---|---|---|
| DT° (% DT°max) | 0 | 16 | 33 | 50 | 66 | 83 | 100 |
| TLRi (% TLRimax) | 0 | 0 | 13 | 30 | 46 | 63 | 80 |

Figure 5:
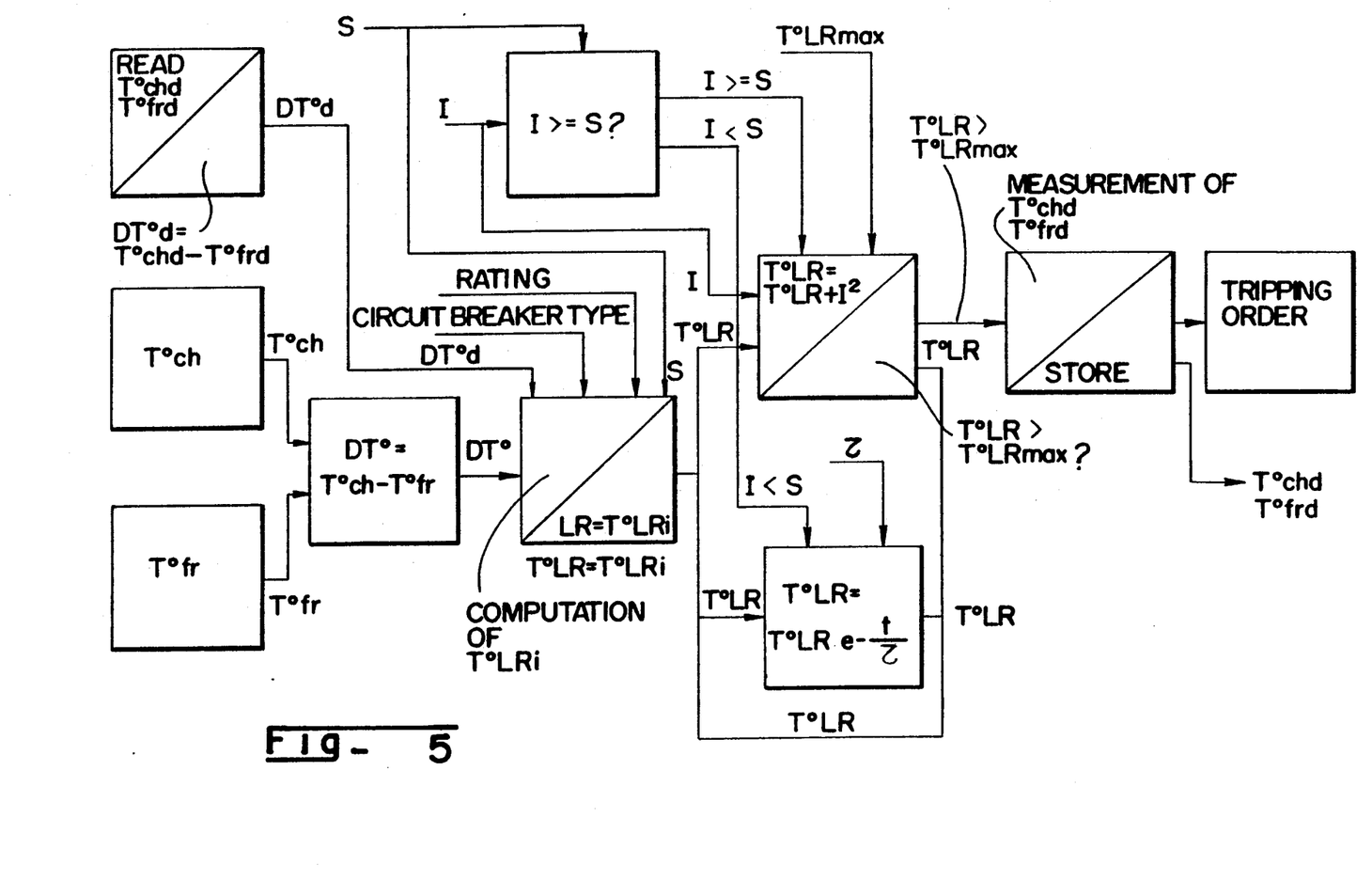

According to another alternative embodiment of the invention, illustrated in FIG. 5, the value DT°max is also a function of the difference DT°d between the temperatures T°chd and T°frd measured at the time of tripping (times t2 or t6 respectively in FIGS. 3 and 7), just before the tripping order is sent. The measured values are stored in an EEPROM memory in the trip device and read by the trip device when the circuit breaker closes. The trip device then computes the temperature difference DT°d on tripping, and after measuring the temperature difference DT° on reclosing, computes the initial value T°LRi. Taking DT°d into account in determining DT°max, and then in computing the initial value T°LRi, enables the actual operating conditions of the circuit breaker to be better taken into account. To give an example, with DT°min=0, T°LRimin=0 and T°LRimax=80% of T°LRmax, let us assume that DT°max corresponding to the circuit breaker type and rating and to the threshold S is equal to 60° C. If when the circuit breaker recloses DT°=30° C., i.e. 50% of DT°max, T°LRi=40% of T°LRmax. If the temperature difference at the time tripping occurs is appreciably lower than DT°max, for example DT°d=40° C., the value DT°=30° C. is obtained more quickly, and less cooling has therefore taken place and it is advisable to reduce the time delay to a greater extent, and to increase the initial value T°LRi accordingly. This is achieved by replacing theoretical DT°max by DT°d. The initial value T°LRi being inversely proportional to DT°max, it does indeed increase when DT°d decreases. In the above example, if DT°max=DT°d=40° C., we obtain T°LRi=60% of T°LRmax for DT°=30° C., i.e. 75% of DT°d and T°LRi=40% of T°LRmax for DT°=20° C., i.e. 50% of DT°d.

In the above example, DT°max is equal to the value DT°d measured when tripping occurs: DT°max=DT°d. It is however possible, as in the embodiment according to FIG. 5, to also take account of the circuit breaker type and rating and of the threshold S to determine DT°max. In practice, in the latter case, a theoretical DT°max is, as in the case in FIG. 5, determined and normally used but is corrected, for example if the setting of the threshold S has been modified during the trip.

In all cases the initial value T°LRi is inversely proportional to a temperature difference DT°max which is a function of the circuit breaker type, rating, and threshold S and/or the temperature difference DT°d measured at the time of the previous trip.

Figure 8:
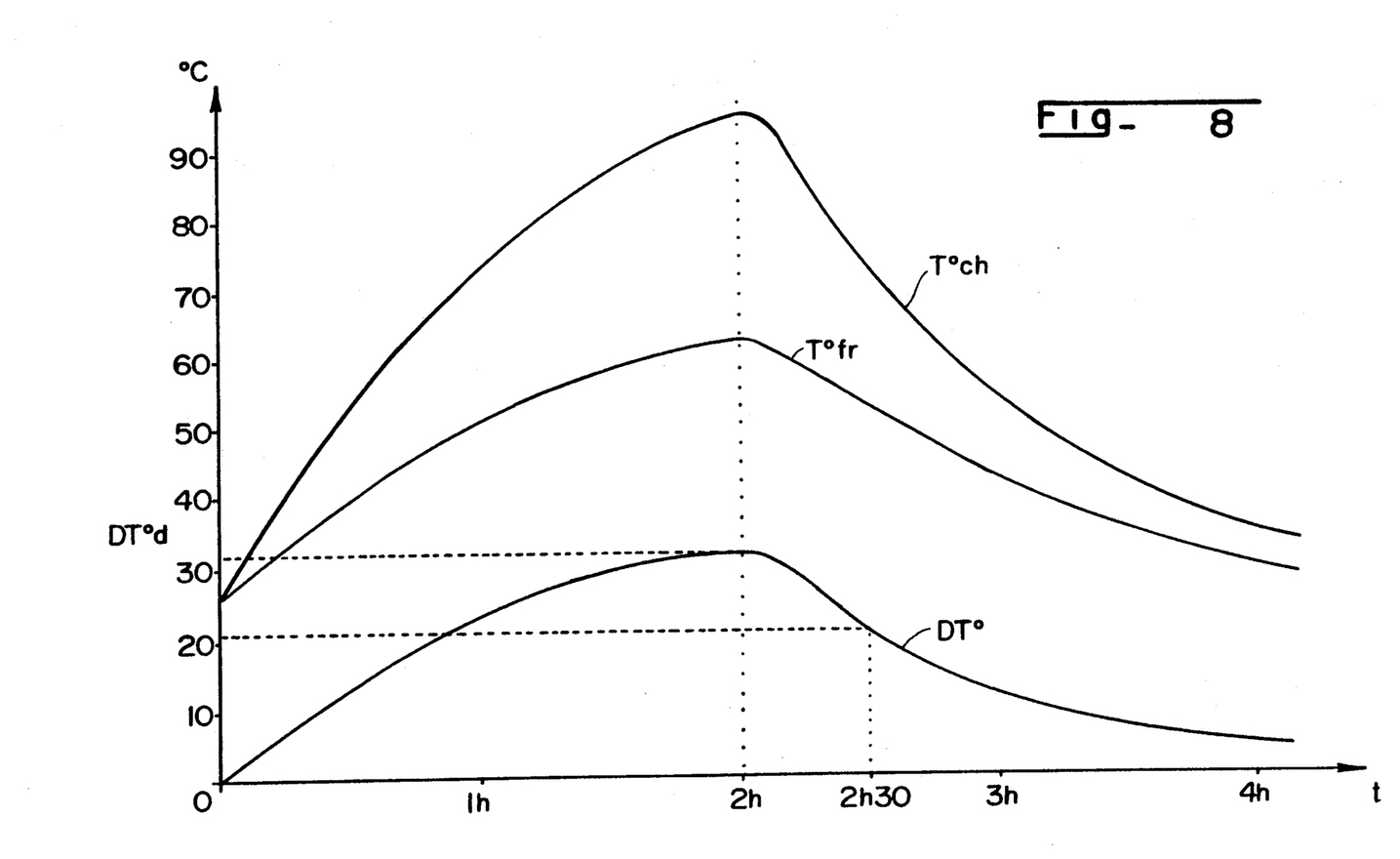
FIG. 8 represents the values of the temperatures measured in a particular circuit breaker.

The value DT°min may be determined so as to adjust the actual circuit breaker cooling time constant to a preset lower time constant. The temperature variations measured in a three-pole trip device of 1000 Amps rating are represented as an example in FIG. 8. The maximum temperature difference DT°d obtained at the time of tripping after 2 hours temperature rise is 32° C. Half an hour after tripping, the temperature difference DT°d is about 66% of DT°d. If DT° can vary between DT°max=DT°d and DT°min=0, the cooling time constant is given by:

$$t/\ln(DT°max/DT°) = 0.5/\ln 1.5 = 1hr\ 14mins.$$

If DT°min is raised, this time constant is given by: $t/\ln(DT°max/(DT°-DT°min))$. It can be verified that for DT°min=20% of DT°max we obtain a time constant of 38 mins. By adjusting DT°min, the circuit breaker case cooling time constant can therefore be modified artificially so as to bring it in line with the time constant of the system protected by the circuit breaker.

In the embodiment represented in FIG. 2, the hot zone thermistors are in contact with the wall 24 of the circuit breaker case. The invention is not limited to such an arrangement. The thermistors merely have to be located in a part of the case having a temperature representative of the temperature rise and cooling of the system. The temperature rise of the system being due to the current flowing through it, the hot zone thermistors are located in proximity to the conducting terminals 12. If they are located directly on these terminals, they cool very quickly after the current has been interrupted and their temperature is not representative of the cooling of the system. The thermal inertia of the molded case enables a good thermal image of the system to be obtained and by locating the thermistors on the case, in proximity to the conducting terminals 12, this property is taken advantage of to simulate cooling of the system. The thermal inertia of insulated cables 26 connected to the conducting terminals and arranged in proximity to the latter can also be used. Thus, the thermistors will be arranged in proximity to an insulating component, preferably a wall of the case, situated in proximity to at least one current conducting terminal. The thermistors will preferably be arranged in contact with this insulating component. The trip device can in computing the initial value T°LRi take account of the possible difference between the cooling time constant of the case, determined experimentally, and the cooling time constant of the system protected by the circuit breaker, correction being made by the choice of the constant DT°min.

The thermistors can in addition be used by the trip device to provide a thermal tripping function if the temperature in the circuit breaker exceeds a present value.

The invention has been described above with reference to the long delay tripping function of a trip device. It can be used in the same way for the other tripping functions. The two embodiments in FIGS. 4 and 5 adapted to the two tripping functions: long delay and short delay, for the tripping time constants are small in relation to the thermal memory function.

In FIG. 5, only long delay tripping is dealt with. For short delay tripping the last value of T°LR can be stored and this value be considered as T°LRimax when initialization takes place.

I claim:

1. A molded case electrical circuit breaker, comprising at least one connection terminal to a conductor designed to be protected by the circuit breaker, detection means of the current flowing in the conductor, measurement means of the temperature in a predetermined zone of the circuit breaker, an electronic trip device, to which the output signals from the current detection means and the temperature measurement means are applied, performing at least a delayed tripping function so as to generate a tripping order when the current exceeds preset thresholds, the trip device comprising means designed to modify a tripping function time delay in terms of the temperature measured when the circuit breaker closes, the circuit breaker comprising tripping means controlled by said tripping order, the temperature measurement means comprising temperature measurements means in a cold zone of the case and temperature measurement means in a hot zone of the case, in proximity to the connection terminals, the trip device comprising computation means of the temperature difference between the hot and cold zones, and means designed to modify the tripping function time delay in a manner inversely proportional to the temperature difference measured when the circuit breaker closes.

2. The circuit breaker according to claim 1, wherein the trip device, in order to perform the delayed tripping function, comprises comparison means of a quantity representative of the thermal state of the circuit breaker with a preset maximum value, means of incrementing this quantity when the current is greater than or equal to a preset tripping threshold and of decrementing it when the current is lower than said threshold, the means designed to modify the time delay comprising initialization means of said quantity when the circuit breaker closes, an initial value of the quantity being proportional to the temperature difference measured when the circuit breaker closes.

3. The circuit breaker according to claim 2, wherein the initial value is lower than a preset maximum initial value.

4. The circuit breaker according to claim 1, wherein the temperature measurement means comprise thermistors.

5. A molded case electrical circuit breaker, comprising at least one connection terminal to a conductor designed to be protected by the circuit breaker, detection means of the current flowing in the conductor, measurement means of the temperature in a predetermined zone of the circuit breaker, an electronic trip device, to which the output signals from the current detection means and the temperature measurement means are applied, performing at least a delayed tripping function so as to generate a tripping order when the current exceeds preset thresholds, the trip device comprising means designed to modify a tripping function time delay in terms of the temperature measured when the circuit breaker closes, the circuit breaker comprising tripping means controlled by said tripping order, the temperature measurement means comprising temperature measurement means in a cold zone of the case and temperature measurement means in a hot zone of the case, in proximity to the connection terminals, the trip device comprising computation means of the temperature difference between the hot and cold zones and means designed to modify the tripping function time delay in a manner inversely proportional to the temperature difference measured when the circuit breaker closes;

said trip device, in order to perform the delayed tripping function, comprises comparison means of a quantity representative of the thermal state of the circuit breaker with a preset maximum value, means of incrementing this quantity when the current is greater than or equal to a preset tripping threshold and of decrementing it when the current is lower than said threshold, the means designed to modify the time delay comprises initialization means of said quantity when the circuit breaker closes, an initial value of said quantity being proportional to the temperature difference measured when the circuit breaker closes;

said trip device further comprises storing means for storing of the hot and cold temperatures measured just before a tripping order is sent, reading means of the stored values when the circuit breaker subsequently closes and wherein said computation means computes the temperature difference between the hot and cold temperatures on tripping, the initial value being such that the relationship between this initial value and the maximum value of the quantity representative of the thermal state of the circuit breaker is proportional to the relationship between the temperature difference when the circuit breaker closes and a maximum temperature difference, the latter being equal to the temperature difference measured at the time of a previous circuit breaker trip.

6. The circuit breaker according to claim 5, wherein when the temperature difference when the circuit breaker closes is lower than or equal to a preset minimum value, the initial quantity is equal to a preset minimum initial value, and wherein when the temperature difference when the circuit breaker closes is greater than said minimum value, the relationship between the initial quantity and the difference between the maximum value of the quantity representative of the thermal state of the circuit breaker and the minimum initial value is proportional to the relationship between on the one hand the difference between the temperature difference when the circuit breaker closes and the minimum value, and on the other hand the difference between the maximum temperature difference and said minimum value.

7. The circuit breaker according to claim 5, wherein the initial value is lower than a preset maximum initial value.

8. The circuit breaker according to claim 5, wherein the temperature measurement means comprise thermistors.

9. The circuit breaker according to claim 8, therein said thermistors are designed to measure the temperature of the cold zone, located in proximity to the front face of the trip device, and the temperature of the hot zone, located in proximity to a connection terminal of the circuit breaker.

10. The circuit breaker according to claim 9, wherein the temperature measurement thermistors of the hot zone are arranged in such a way as to be in contact with a wall of the circuit breaker case.

11. The circuit breaker according to claim 9, wherein the temperature measurement thermistors of the hot zone are fitted on insulating cables connected to the connection terminals.

12. A molded case electrical circuit breaker, comprising at least one connection terminal to a conductor designed to be protected by the circuit breaker, detection means of the current flowing in the conductor, measurement means of the temperature in a predetermined zone of the circuit breaker, an electronic trip device, to which the output signals from the current detection means and the temperature measurement means are applied, performing at least a delayed tripping function so as to generate a tripping order when the current exceeds preset thresholds, the trip device comprising means designed to modify a tripping function time delay in terms of the temperature measured when the circuit breaker closes, the circuit breaker comprising tripping means controlled by said tripping order, the temperature measurement means comprising temperature measurement means in a cold zone of the case temperature measurement means in a hot zone of the case, in proximity to the connection terminals, the trip device comprising computation means of the temperature difference between the hot and cold zones and means designed to modify the tripping function time delay in a manner inversely proportional to the temperature difference measured when the circuit breaker closes;

said trip device, in order to perform the delayed tripping function, comprises comparison means of a quantity representative of the thermal state of the circuit breaker with a preset maximum value, means of incrementing this quantity when the current is greater than or equal to a preset tripping threshold and of decrementing it when the current is lower than said threshold, the means designed to modify the time delay comprises initialization means of said quantity when the circuit breaker closes, an initial value of said quantity being proportional to the temperature difference measured when the circuit breaker closes;

wherein the relationship between the initial quantity and the maximum value of the quantity representative of the thermal state of the circuit breaker is proportional to the relationship between the temperature difference when the circuit breaker closes and a maximum temperature difference determined according to the circuit breaker type, the circuit breaker rating and the tripping threshold.

13. A molded case electrical circuit breaker, comprising at least one connection terminal to a conductor designed to be protected by the circuit breaker, detection means of the current flowing in the conductor, measurement means of the temperature in a predetermined zone of the circuit breaker, an electronic trip device, to which the output signals from the current detection means and the temperature measurement means are applied, performing at least a delayed tripping function so as to generate a tripping order when the current exceeds preset thresholds, the trip device comprising means designed to modify a tripping function time delay in terms of the temperature measured when the circuit breaker closes, the circuit breaker comprising tripping means controlled by said tripping order, the temperature measurement means comprising temperature measurement means in a cold zone of the case and temperature measurement means in a hot zone of the case, in proximity to the connection terminals, the trip device comprising computation means of the temperature difference between the hot and cold zones and means designed to modify the tripping function time delay in a manner inversely proportional to the temperature difference measured when the circuit breaker closes;

wherein the temperature measurement means comprise thermistors, and said thermistors are designed to measure the temperature of the cold zone, located in proximity to the front face of the trip device, and the temperature of the hot zone, located in proximity to a connection terminal of the circuit breaker.

14. The circuit breaker according to claim 13, wherein the temperature measurement thermistors of the hot zone are arranged in such a way as to be in contact with a wall of the circuit breaker case.

15. The circuit breaker according to claim 13, wherein the temperature measurement thermistors of the hot zone are fitted on insulating cables connected to the connection terminals.

* * * * *